March 20, 1945.　　G. P. LESSMANN ET AL　　2,372,096
INDUCTION REGULATOR
Filed June 16, 1942　　2 Sheets-Sheet 1
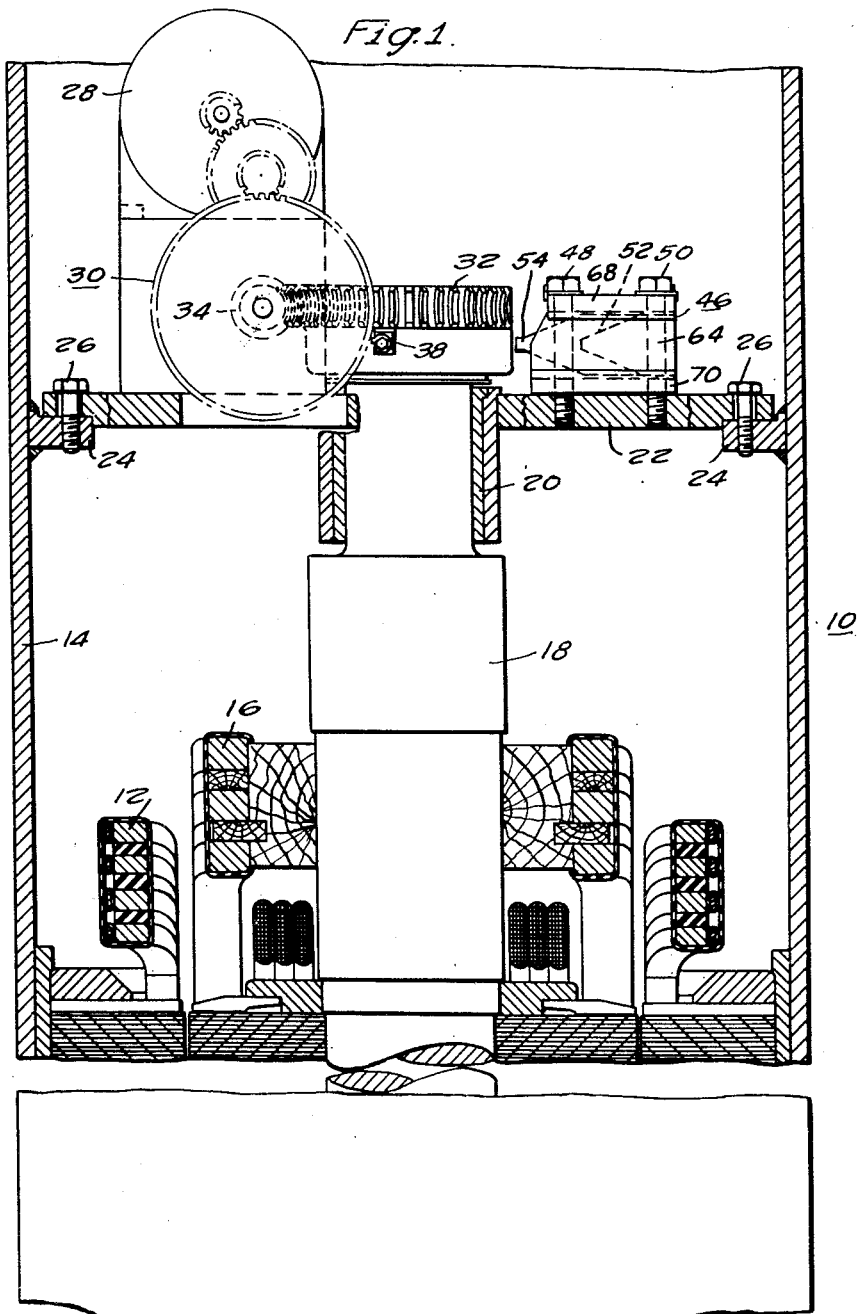
WITNESSES:
E. A. McGlykey
Nm. C. Groome
INVENTORS
Gerhard P. Lessmann
and Lester G. Tubbs.
BY James N. Ely
ATTORNEY March 20, 1945.   G. P. LESSMANN ET AL   2,372,096
INDUCTION REGULATOR
Filed June 16, 1942   2 Sheets-Sheet 2
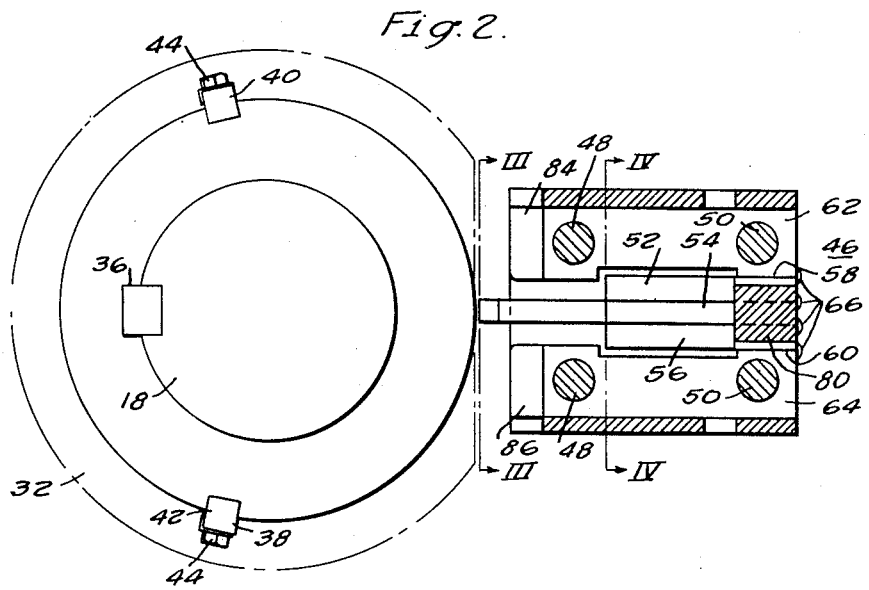
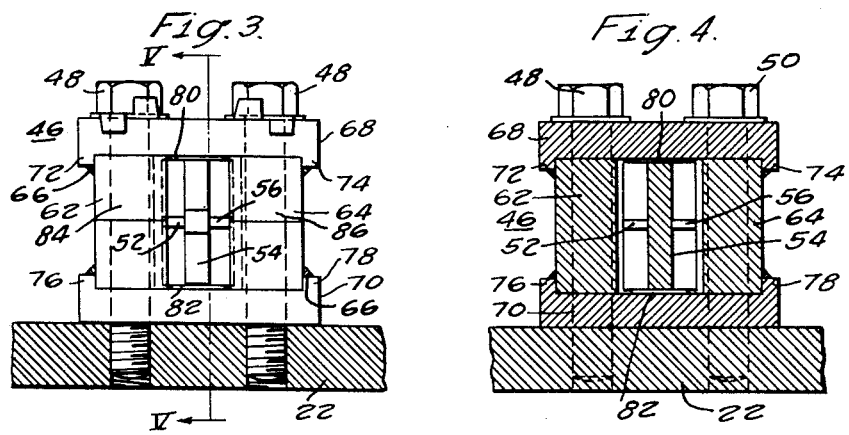
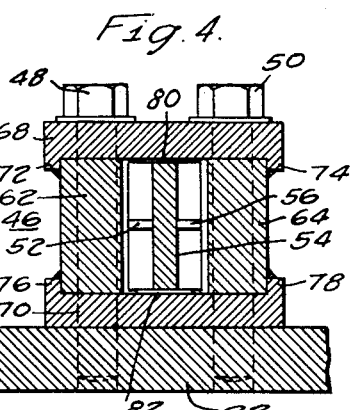
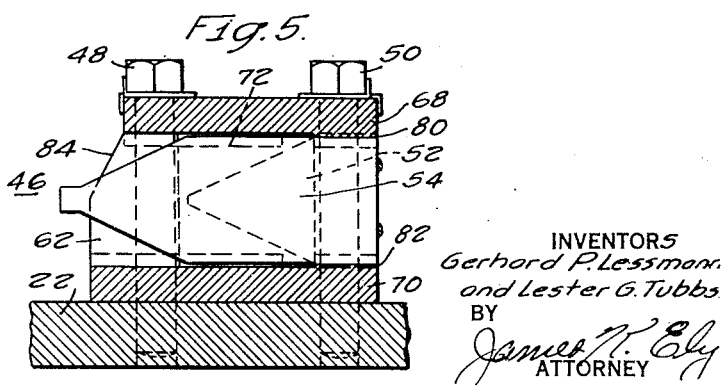
WITNESSES:
E. A. McCloskey
Nw. C. Goome
INVENTORS
Gerhard P. Lessmann
and Lester G. Tubbs
BY
James N. Ely
ATTORNEY Patented Mar. 20, 1945

2,372,096

UNITED STATES PATENT OFFICE 2,372,096

INDUCTION REGULATOR

Gerhard P. Lessmann, Wilkinsburg, and Lester G. Tubbs, Forest Hills, Pa., assignors to Westinghouse Electric & Manufacturing Company, East Pittsburgh, Pa., a corporation of Pennsylvania Application June 16, 1942, Serial No. 447,246

7 Claims. (Cl. 171—119)

This invention relates to electric apparatus and, in particular, to induction regulators.

In induction regulators, the rotors are usually rotated by a small squirrel-cage motor through a train of gears and a worm gear segment, which is large enough for only about 180° rotation. Usually a limit switch is employed in conjunction with the rotor to electrically control the operation of the motor to limit the rotor movement to the arc determined by the gear segment. In addition, a mechanical stop is usually provided to effect a positive stop of the drive in case the limit switch fails to function. In such apparatus, the positive stop has been found, upon failure of the limit switch, to effect such a sudden stop of the drive that the torque developed reaches such a high value as to cause the teeth of the gears to be stripped with accompanying damage to the rest of the apparatus.

It is an object of this invention to provide for mechanically limiting the movement of the rotor of an induction regulator while preventing damage to the drive.

Another object of this invention is to provide for effecting a gradual mechanical braking of the drive at the operating limits for an induction regulator without damaging the drive or component parts thereof.

Other objects of this invention will become apparent from the following description when taken in conjunction with the accompanying drawings, in which:

Figure 1 is a vertical view, partly in section, of an induction regulator embodying the teachings of this invention;

Fig. 2 is a plan view, partly in section and greatly enlarged, of a part of the apparatus shown in Fig. 1;

Fig. 3 is a view in elevation of part of the apparatus of Fig. 2 as taken along the line III—III.

Fig. 4 is a view in section taken along the line IV—IV of Fig. 2 illustrating the spring assembly as mounted on a top plate of a regulator; and Fig. 5 is a view, partly in section, taken along the line V—V of Fig. 3.

Referring to Fig. 1 of the drawings, the invention is illustrated as applied to an induction regulator 10. The regulator comprises a stator winding 12 mounted within a tank or casing 14 and a cooperating rotor winding 16 carried by a vertical shaft 18. The vertical shaft 18 is supported in operative position within the tank 14 by means of supporting bearings disposed at the ends of the shaft, only the upper bearing 20 being illustrated. As shown, the upper bearing 20 is carried by a horizontal strap, flange or top plate 22 disposed within and extending across the tank 14 and secured to the tank flanges 24 by screws 26. The stator windings 12 and rotor windings 16 are usually immersed in oil (not shown) in the tank 14 which completely encloses the regulator windings.

In order to drive the rotor 16, a motor 28 is carried within the tank 14 below the cover (not shown) by the top plate 22 and is connected by a train of gears 30 for actuating the rotor shaft 18. As shown, the upper end of the rotor shaft 18 terminates above the top plate 22 and carries a worm gear segment 32 which is engaged by and cooperates with the worm 34 of the train of gears. The segment 32 is secured to the shaft 18 by a key 36, as shown in Fig. 2, and is provided with two fixed stops 38 and 40.

The stops 38 and 40 may be of any desired type or, as illustrated, may be formed as a block 42 of suitable material secured to the periphery of the segment 32 below the gear teeth thereof in spaced relation by the screws 44. As illustrated, the stops 38 and 40 are spaced apart not less than 180°, so that a full 180° of movement can be obtained in operating the rotor 16.

Adjacent the segment 32, there is a spring leaf assembly 46 disposed to be selectively engaged by the stops 38 and 40 as the rotor is operated, depending upon the direction of operation of the rotor. The assembly 46 is preferably rigidly secured to the top plate 22 by means of the screws 48 and 50, two of each being provided.

Referring to Figs. 2 through 5, the spring leaf assembly 46 is illustrated in detail, like numbers being used in each of the figures to designate like parts. As illustrated, the leaf spring assembly 46 comprises a plurality of leaf springs 52, 54 and 56 assembled with their bases held between pads 58 and 60 formed on side plate members 62 and 64, respectively. The spring members 52 and 56 are somewhat shorter than the spring member 54, and are preferably tack welded to each other and to the side plate members, as shown at 66. The shorter spring members 52 and 56 are disposed on opposite sides of the leaf spring 54, thereby strengthening the spring 54.

In addition to the side plates 62 and 64, a top plate member 68 and a bottom plate member 70 are provided for receiving the side plate members 62 and 64 when the spring members are held therebetween. The top member 68, as better illustrated in Figs. 3 and 4, is provided with depending flange edges 72 and 74 which fit over the edge of the spaced side plate members 62 and

64, and the bottom plate member 70 likewise is provided with upwardly extending flange edges 76 and 78 for fitting over the edges of the spaced side plate members 62 and 64. In order to provide room for a movement of the spring members between the top plate 68 and the bottom plate 70 and to aid in securing the spring members, the top plate 68 is provided with a depending projecting pad portion 80, and the bottom plate is provided with an upwardly projecting pad portion 82 for seating against the base of the springs 52, 54 and 56. The entire assembly of the side plates and top plate, as well as the base of the spring members, are suitably welded as an integral unit, as illustrated in Figs. 3 and 4.

Again referring to Figs. 2 and 4, it is seen that the side plate members 62 and 64 of the leaf spring assembly 46 have cutout portions adjacent the spring members 52 and 56 for permitting sideways movement of the spring members when a force is applied to the free end of the spring 54 of the bonded leaf springs 52, 54 and 56. Also, it is seen that the side plate members 62 and 64 have beveled ends 84 and 86, respectively, for clearing the gear teeth of the worm segment 32 as it is driven by the motor 28. As more clearly illustrated in Figs. 3, 4 and 5, the screws 48 and 50 extend through the top plate member 68, side plate members and the bottom plate member 70 into the plate or flange member 22 carried within the tank 14. The spring leaf assembly 46 is thus rigidly secured against movement when either of the stop members 38 or 40 engage the projecting end of the elongated leaf spring member 54.

In operation, with the apparatus assembled as described hereinbefore, the motor 28 operates to effect a rotation of the rotor 16 towards one or the other of the predetermined limits. If the electric limit switches (not shown) fail, then one of the fixed stops 38 or 40, depending upon the direction of rotation of the rotor 16, is actuated to engage the free end of the elongated leaf spring 54 of the leaf spring assembly 46. Upon engagement of one of the stops 38 or 40 with the end of the spring member 54, the leaf springs 52, 54 and 56 are biased in the direction of movement of the stop. However, the force of the spring members opposing the movement of the stop 38 or 40 becomes increasingly larger as the leaf springs are biased toward the side plate of the assembly 46 to apply an increasing pressure in opposition to the force of the drive. This pressure is increased until the leaf spring members overcome the force of the drive, the increasing pressure acting as an increasing braking action on the drive. When the pressure of the spring members 52, 54 and 56 overcomes the force of the drive, the motor 28 is stalled and further movement of the rotor 16 is prevented.

As will be apparent, the gradual increase of pressure of the leaf springs 52, 54 and 56 prevents sudden shock from being applied to the drive, thereby preventing the stripping of the teeth of the gear drive. It will be apparent that, by varying the length and strength of the leaf spring members, the force applied in opposition to the force of the drive can be somewhat varied, it being essential, however, that the springs be sufficiently resilient to prevent a sudden application of a fixed force against the force of the drive. In practice, it is found that with the leaf spring assembly described hereinbefore it is possible to stall the motor without causing more than 120% stalling torque in the whole drive.

Although this invention has been described with reference to a particular embodiment thereof, it is, of course, not to be limited thereto except in so far as is necessitated by the scope of the appended claims.

We claim as our invention:

1. In an induction regulator provided with a stator and a rotor disposed in cooperative relation thereto, in combination, a shaft disposed to carry the rotor, a drive for operating the rotor, the drive including a gear train, a pair of stop members carried in spaced relation by the shaft, the spacing of the stop members being predetermined to establish the arc through which the rotor can be operated, and spring means independent of the gear train disposed to be selectively engaged by the stop members dependent upon the operation of the rotor, the spring means having sufficient resiliency to effect an increasing braking of the driving operation to stall the drive while preventing damage to the gear train.

2. In an induction regulator provided with a stator and a rotor disposed in cooperative relation thereto, in combination, a shaft disposed to carry the rotor, a motor for operating the rotor, a train of gears including a worm and worm gear between the motor and the shaft, a plurality of stop members carried by the worm gear in spaced relation to each other, the spacing of the stop members being predetermined to establish the arc through which the rotor can be operated, and spring means independent of the train of gears disposed to be selectively engaged by the stop members dependent upon the operation of the motor to limit the operation of the rotor, the spring means having sufficient resiliency to effect an increasing braking of the driving operation when engaged by the stop members to stall the motor while preventing damage to the train of gears.

3. In an induction regulator provided with a stator and a rotor disposed in cooperative relation thereto, in combination, a shaft disposed to carry the rotor, a motor for operating the rotor, a train of gears including a worm and worm gear between the motor and the shaft, stop members carried by the worm gear, the stop members being spaced at not less than 180° apart to establish the arc through which the rotor can be operated, and resilient spring means independent of the train of gears disposed between the stop means to be selectively engaged thereby upon operation of the motor to limit the operation of the rotor, the spring means having sufficient resiliency to effect an increasing braking of the driving operation when engaged by one of the stop members to stall the motor and prevent damage to the train of gears.

4. In an induction regulator provided with a stator and a rotor disposed in cooperative relation thereto, in combination, a shaft disposed to carry the rotor, a motor for operating the rotor, a train of gears including a worm and a worm gear between the motor and the shaft, a plurality of stop members carried by the worm gear in spaced relation to each other disposed for movement as the worm gear moves, the spacing of the stop members being predetermined to establish the arc through which the rotor can be operated, and a leaf spring assembly having an elongated spring member disposed independently of the train of gears to extend into the path of movement of the stop members to be selectively engaged thereby to limit the operation of the rotor, the spring member being strong enough and having sufficient resiliency to effect an increasing braking of the driving operation when engaged by one of the stop members to stall the motor and prevent damage to the train of gears.

5. In a motor operated mechanism provided with a stationary member and another member disposed to be rotated in cooperative relation thereto through an arc of less than 360°, in combination, a shaft disposed to carry the rotatable member, a drive for operating the rotatable member, the drive including a gear train, a pair of stop members associated with the rotatable member, the stop members being disposed in spaced relation for establishing the limits of the arc of movement of the rotatable member, and spring means disposed to be selectively engaged by the stop members dependent upon the operation of the rotatable member, the spring means having sufficient resiliency to effect an increasing braking of the driving operation to stall the drive while preventing damage to the gear train.

6. In apparatus provided with a stationary member and another member disposed to be rotated in forward and reverse directions in cooperative relation thereto through an arc of less than 360°, in combination, a shaft disposed to carry the rotatable member, a motor for driving the shaft, a train of gears disposed between the motor and the shaft, a pair of spaced stop members associated with the rotatable member disposed for movement therewith, the spacing of the stop members determining the arc through which the rotatable member can be operated, and spring means disposed to be selectively engaged by the stop members dependent upon the operation of the motor to mechanically limit the movement of the rotatable member, the spring means having sufficient resiliency to effect an increasing braking of the driving operation when engaged by one of the stop members to stall the motor while preventing damage to the train of gears.

7. In apparatus provided with a stationary member and another member disposed to be rotated in forward and reverse directions in cooperative relation thereto through an arc of less than 360°, in combination, a shaft disposed to carry the rotatable member, a motor for driving the shaft, a train of gears disposed between the motor and the shaft, a pair of spaced stop members associated with the rotatable member disposed for movement therewith, the spacing of the stop members determining the arc through which the rotatable member can be operated, and a leaf spring assembly having an elongated spring member disposed to extend into the path of movement of the stop members to be selectively engaged thereby to mechanically limit the movement of the rotatable member, the spring assembly being strong enough and having sufficient resiliency to effect an increasing braking of the driving operation when engaged by one of the stop members to stall the motor while preventing damage to the train of gears.

GERHARD P. LESSMANN.
LESTER G. TUBBS.